(12) United States Patent
Smith et al.

(10) Patent No.: US 7,016,401 B1
(45) Date of Patent: Mar. 21, 2006

(54) METHOD AND APPARATUS FOR AUTOMATED CORRELATION OF DIGITAL MODULATION IMPAIRMENT

(75) Inventors: Patrick D. Smith, Deerfield, IL (US); Robert G. Uskali, Schaumburg, IL (US)

(73) Assignee: Motorola, Inc, Horsham, PA (US)

( * ) Notice: Subject to any disclaimer, the term of this patent is extended or adjusted under 35 U.S.C. 154(b) by 0 days.

(21) Appl. No.: 09/470,890

(22) Filed: Dec. 22, 1999

(51) Int. Cl.
*H04B 1/38* (2006.01)
(52) U.S. Cl. .................................... 375/222; 375/346
(58) Field of Classification Search ............... 375/222, 375/219, 324, 346, 316, 341
See application file for complete search history.

(56) References Cited

U.S. PATENT DOCUMENTS

| | | | |
|---|---|---|---|
| 3,864,632 A | 2/1975 | Chang | |
| 4,481,645 A | 11/1984 | Karabinis | |
| 5,095,535 A | 3/1992 | Freeburg | |
| 5,153,877 A | 10/1992 | Esaki | |
| 5,479,447 A | 12/1995 | Chow et al. | |
| 5,541,955 A * | 7/1996 | Jacobsmeyer | 375/222 |
| 5,822,299 A | 10/1998 | Goodman | |
| 5,825,829 A | 10/1998 | Borazjani et al. | |
| 5,838,740 A | 11/1998 | Kallman et al. | |
| 5,883,819 A | 3/1999 | Abu-Amera | |
| 5,901,185 A | 5/1999 | Hassan | |
| 6,032,019 A | 2/2000 | Chen et al. | |
| 6,134,230 A | 10/2000 | Olofsson | |
| 6,144,696 A | 11/2000 | Shively et al. | |
| 6,212,229 B1 | 4/2001 | Salinger | |
| 6,246,717 B1 | 6/2001 | Chen et al. | |
| 6,314,085 B1 | 11/2001 | Saranka | |
| 6,363,053 B1 | 3/2002 | Schuster | |
| 6,389,068 B1 | 5/2002 | Smith et al. | |
| 6,442,158 B1 | 8/2002 | Beser | |
| 6,523,068 B1 | 2/2003 | Beser et al. | |
| 6,526,538 B1 * | 2/2003 | Hewitt | 714/780 |
| 6,560,445 B1 * | 5/2003 | Fette et al. | 455/91 |
| 6,588,016 B1 | 7/2003 | Chen et al. | |
| 6,700,875 B1 | 3/2004 | Schroeder | |
| 2001/0001007 A1 | 5/2001 | Polley et al. | |
| 2003/0016174 A1 * | 1/2003 | Anderson | 342/378 |

FOREIGN PATENT DOCUMENTS

WO    WO 97/48197    12/1997
WO    WO 9818210 A2 *    4/1998

OTHER PUBLICATIONS

U.S. Appl. No. 09.712,812, filed Nov., 2000, Smith et al., (U.S. 6,909,741).

* cited by examiner

*Primary Examiner*—Kevin Burd
(74) *Attorney, Agent, or Firm*—Benjamin D. Driscoll

(57) ABSTRACT

A method and apparatus for automated correlation of digital modulation impairment is described. The technique obtains soft decision data (116, 2502) and extracts signal space location information of sufficient resolution to distinguish different types of impairment to a digitally modulated signal. The technique applies an error vector magnitude mask (117, 502) and determines the signal-to-noise ratio of the digitally modulated signal. The technique applies impairment masks (118, 2504) and provides a characterization (119) of impairment affecting the digitally modulated signal (112). The technique determines a subset of the soft decision data (116, 2502) that falls within the impairment masks (118, 2505) and calculates correlation weights (2506). The technique may be used to identify, isolate, and classify different types of impairment. Given sufficient data collection, sources of impairments may be determined precisely.

32 Claims, 8 Drawing Sheets

METHOD AND APPARATUS FOR AUTOMATED CORRELATION OF DIGITAL MODULATION IMPAIRMENT

FIELD OF THE INVENTION

The invention relates generally to electronic signal receivers and more specifically to receivers for receiving digitally modulated signals.

BACKGROUND OF THE INVENTION

A transmitter sends a signal over a medium. A receiver obtains the signal transmitted over the medium and converts it to meaningful information, for example by demodulating the signal. Since information is often expressed in a digital form, for example as a stream of finite values of data, transmitters often send digitally modulated signals wherein the signals are modulated according to information expressed in a digital form.

Various modulation techniques have been developed to efficiently transmit information expressed in a digital form. These include amplitude modulation and phase modulation. For example, quadrature phase shift keying (QPSK), π/4 (pi over four) DQPSK, and M-level quadrature amplitude modulation (QAM) are a few such techniques. These techniques define a constellation of symbols, where each symbol may be used to communicate a plurality of bits of data. The symbols are identified based on their position on an I/Q plane. To receive a signal modulated according to one of these techniques, a receiver distinguishes the position of one symbol in the I/Q plane from the positions of other symbols.

The number of symbols in a constellation may be defined as whatever level is appropriate. For example, a QPSK system provides a constellation of four symbols. QAM systems may be defined to have constellations of 16 symbols (16 QAM), 64 symbols (64 QAM), or 256 symbols (256 QAM). One skilled in the art would recognize the multitude of variations that are possible based on the locations of symbols of a signal on an I/Q plane from amplitude modulation, phase modulation, or a combination of amplitude and phase modulation.

Unfortunately, various types of impairments may affect the location of a received symbol on the I/Q plane. For example, phase noise, such as that introduced by receiving or transmitting circuits, results in an angular displacement of symbol locations with respect to the origin of the I/Q plane and the ideal symbol coordinates. As another example, continuous wave (CW) noise changes the appearance of the symbols over time from single points to circles. As a further complication, multiple types of impairment may be present simultaneously. For example, If phase noise occurs in combination with CW noise, the circles attributed to the CW noise may be elongated to more of an elliptical or crescent shape by the influence of the phase noise. All of these types of impairments can be further obscured on the I/Q plane by the presence of additive white Gaussian noise.

If impairment is sufficient to cause ambiguity as to the location of a symbol, an error can occur when the signal is received. For a digitally-modulated signal to be converted to meaningful information, it is processed and applied to a data slicer. The data slicer makes a hard decision as to the data understood to be represented by the signal. When severe impairment exists, the data slicer may misidentify the data represented by the symbol, resulting in an error in the received hard decision data. To obtain correct data, the error will have to be corrected according to an error correction protocol or the data will have to be retransmitted or considered lost. Such errors adversely affect the data rate capability between the transmitter and the receiver, thereby reducing system performance.

In the prior art, it was necessary to manually connect specialized test equipment to a receiver in an attempt to understand impairment. However, the specialized test equipment had to be observed by skilled personnel who would attempt to understand the information displayed on the specialized test equipment. Since the specialized test equipment provided a display of information relating to a specific point in time, analysis of impairment behavior over time was possible only if the skilled personnel observed the specialized test equipment over time and were able to mentally process the information with the hope of correlating the impairment information.

Unfortunately, combinations of different types of impairment often obscured the understanding of the true nature or weight of the individual impairments. Moreover, boredom and strain on the skilled personnel interfered with accurate observation over time. Furthermore, no technique was provided to display impairment information gathered over time in a manner that allows interpretation of the historic nature of the impairments. Also, no technique was provided to display the severity and other characteristics of a particular type of impairment.

Another problem of prior art techniques is that they usually involve interruptions of service when test equipment is connected to a system under test. Such interruptions can increase customer dissatisfaction in addition to dissatisfaction resulting from the impairments being analyzed.

Communication links transmitting bursts of data ("bursty data") are difficult to analyze, and information provided by prior art test equipment will be ambiguous for such communication links because of the lack of continuously received data. Moreover, bursty data from multiple service areas, subnets, subscribers, or transmission sources make analysis using prior art techniques practically impossible, as signal qualities will be the superposition of all such sources.

Thus, a technique is needed to identify impairment of a digitally-modulated signal in a manner that avoids the disadvantages of the prior art.

DETAILED DESCRIPTION OF A PREFERRED EMBODIMENT

A method and apparatus for automated correlation of digital modulation impairment is described. The technique obtains soft decision data and extracts signal space location information of sufficient resolution to distinguish different types of impairment to a digitally modulated signal. The technique applies an error vector magnitude mask and determines the signal-to-noise ratio (SNR) of the digitally modulated signal. The technique applies impairment masks and characterizes impairment affecting the digitally modulated signal. The technique may be used to identify, isolate, and classify different types of impairment in a manner that does not result in service interruptions. Both symbol-level and constellation-level impairment can be correlated. Given sufficient data collection, sources of impairments may be determined. For example, subscriber impairments may be distinguished from system impairments, and individual subscriber faults may be identified.

The invention avoids the need for manual connection of sophisticated test equipment by skilled personnel. Automated correlation of impairment may be performed either locally or remotely. Impairment may be studied over time and results presented in a manner that indicates statistical distribution of impairment over time, for example, using three-dimensional presentations, histograms, or correlation weights to display the results of the impairment correlation.

The invention allows analysis to be performed on individual service areas, subnets, subscribers, transmission sources, and network devices in a system of multiple service areas, subnets, subscribers, transmission sources, and network devices, allowing specific sources of impairment to be pinpointed. For example, the invention allows correlation of a type of impairment to a specific make and model of equipment or to a specific service area where multiple makes and models of equipment may be affected. For example, an internet protocol (IP) packet may be decoded or partially decoded to identify the IP address of the source of that IP packet. The IP address of the source of the IP packet may be correlated with the application of an impairment mask to the signal carrying that IP packet. Thus, a measurement of impairment may be correlated to a specific network device or to a service area, such as a neighborhood, in which multiple network devices are located.

Additionally, the invention allows local or remote testing, or a combination of local and remote testing, to be performed. Impairment correlation may be performed locally, or a command may be transmitted to a remote network device to cause that remote network device to perform impairment correlation and transmit the results back to the device that transmitted the command.

Figure 1:
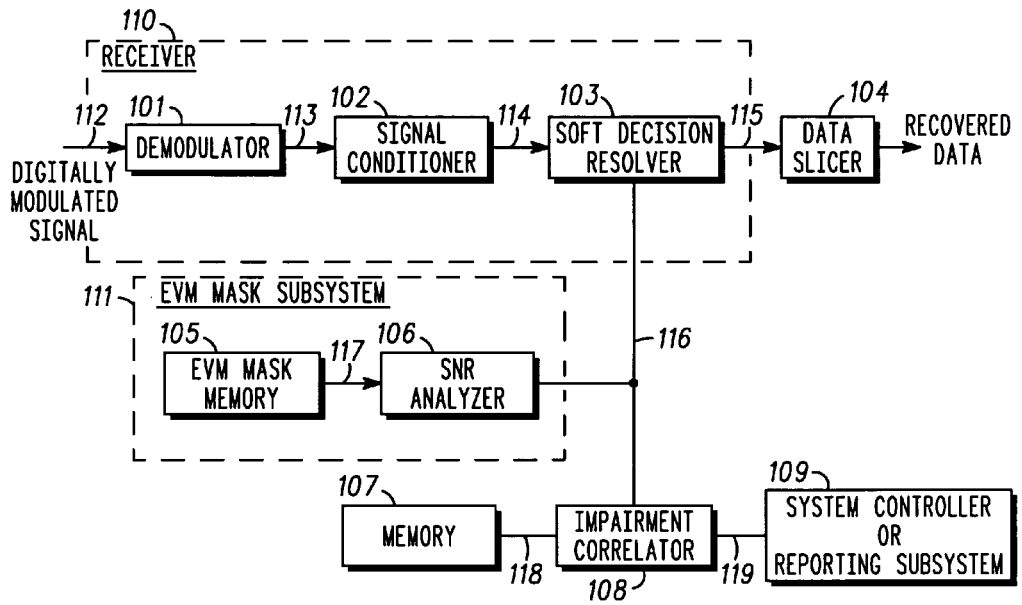
FIG. 1 is a block diagram illustrating a system for identifying impairment of a digitally-modulated signal.

FIG. 1 is a block diagram illustrating a system for identifying impairment of a digitally-modulated signal. A digitally modulated signal 112 is applied to a receiver 110 comprising demodulator 101, signal conditioner 102, and soft decision resolver 103. The demodulator 101 provides a demodulated output 113 based on the digitally modulated signal. The demodulated output 113 of demodulator 101 is processed by a signal conditioner 102. Signal conditioner 102 may apply signal processing such as filtering and DC tracking. Signal conditioner 102 may be practiced according to known signal processing techniques, such as analog signal processing or digital signal processing (DSP). The output 114 of the signal conditioner 102 is provided as soft decision data 115, 116 by soft decision resolver 103. The soft decision resolver 103 identifies the location of a symbol within a region of a constellation defined to include that symbol in signal space. Thus, even within the region of a constellation defined for a symbol, the soft decision resolver 103 provides identification of the location of a particular symbol from among a plurality of possible locations. The soft decision resolver 103 may provide the soft decision data 115, 116 using techniques such as analog-to-digital conversion of the location of the symbol in the I/Q plane. The soft decision resolver 103 may be implemented using hardware-based or software-based techniques for resolving the location of a symbol within the region defined for that symbol in the I/Q plane.

The soft decision data 115 are passed to data slicer 104, which makes hard decisions to provide recovered data. The soft decision data 116 are provided to EVM mask subsystem 111 and to impairment correlator 108. The EVM mask subsystem 111 comprises an EVM mask memory device such as EVM mask memory 105 and SNR analyzer 106. SNR analyzer 106 receives the soft decision data 116, retrieves an EVM mask 117 from EVM mask memory 105 and applies the EVM mask 117 to the soft decision data.

The SNR analyzer 106 uses the soft decision data 116 and the information obtained by applying the EVM mask 117 to analyze the true soft decision data SNR of the digitally modulated signal relative to an acceptable SNR defined by the EVM mask 1117. If the SNR is found to be acceptable, no further analysis is needed. However, if the SNR is found to be deficient, the soft decision data 116 are provided to impairment correlator 108. Alternately, soft decision data 116 may be passed to the impairment correlator 108 without qualification of the SNR if sufficient processing bandwidth is available.

While the SNR analyzer 106 is described with respect to a signal-to-noise ratio, which provides one measure of the quality of the soft decision data and, consequently, of the digitally modulated signal, other measures of quality may be used. Either alternatively or in conjunction with an EVM mask 117, other indicators of quality can be used to determine the severity of impairment. For example, a high forward error correction (FEC) error rate, a high bit error rate (BER), or a high packet error rate (PER) may be used to trigger analysis of impairment.

Impairment correlator 108 analyzes and characterizes the impairment affecting the digitally modulated signal. Impairment correlator 108 obtains an impairment mask 118 from a memory device such as memory 107 and applies it to the soft decision data 116 to produce a characterization 119 of the impairment. The characterization 119 of the impairment is provided to a system controller or reporting subsystem 109, which adapts that system to compensate for the impairment and/or generates a report of the impairment. The system controller or reporting subsystem 109 can adapt the system to compensate for the impairment by adjusting receiver 110. Alternatively, the system controller or reporting subsystem 109 can communicate with the source of the digitally modulated signal over an impairment communication circuit to adjust the digitally modulated signal prior to transmission to compensate for the impairment.

The system controller or reporting subsystem 109 may characterize impairments as having a particular likelihood that they are caused by particular phenomena or from particular sources. For example, the system controller or reporting subsystem 109 may report the percentage of likelihood that each type of impairment is affecting the digitally modulated signal. As an example of such a report, the system controller or reporting subsystem may report that a particular digitally modulated signal has a 60 percent chance that it is affected by phase noise, a 15 percent chance that it is affected by CW noise, a 10 percent chance that it is affected by an I/Q imbalance, a 10 percent chance that it is affected by compression, and a five percent chance that the impairment results from some other phenomenon. Percentages may be determined based on the relative numbers of occurrences of symbols falling within impairment masks defined for different types of impairment and on the relative values derived for different types of impairment using ratio analysis. For example, if twice as many occurrences of a symbol fall within a phase noise impairment mask as fall within a CW noise impairment mask, the likelihood of phase noise impairment being present may be determined to be much higher than the likelihood of CW noise impairment being present. Adjustment factors may be used to compensate for the lack of complete independence between different impairment masks. For example, adjustment factors may be used to compensate for occurrences of symbols that fall within both a phase noise impairment mask and a CW noise impairment mask. The estimated likelihood of all types of impairment may be normalized to a 100 percent scale to allow the likelihood of each type of impairment to be expressed as a percentage.

The system illustrated in FIG. 1 may be used incorporated into any digital signal receiving apparatus. For example, the system may be incorporated into a cable modem that couples equipment at a subscriber location to a cable network. The cable modem may include a cable modem receiver and a cable modem transmitter. The cable modem receiver is responsive to a downstream signal received from a cable modem termination system.

The system may also be incorporated into a cable modem termination system that communicates with a plurality of cable modems. The cable modem termination system may include a cable modem termination system receiver and a cable modem termination system transmitter. The cable modem termination system receiver is responsive to an upstream signal received from a cable modem. The cable modem termination system also includes a network management system coupled to an impairment correlator to provide a corrective control signal to the cable modem that transmits the upstream signal. Thus, the cable modem termination system can alter the operation of the cable modem to correct the impairment. The system may also be incorporated into receiving apparatus such as those used for receiving wireless or satellite communications.

The system illustrated in FIG. 1 may be implemented to include a program storage device readable by a machine, tangibly embodying a program of instructions executable by the machine to perform method steps for correlating impairment of a digitally modulated signal received by the machine. The impairment correlator 108 may be implemented according to such a program of instructions, and the machine may include receiver 110. To allow the machine to execute the program of instructions, the machine may include a processor, such as a microcontroller or other logic circuitry capable of executing the program of instructions. The impairment correlator 108, EVM mask subsystem 111, and system controller or reporting subsystem 109, as well as the machine as a whole, may be implemented using either hardware, software, or a combination thereof, for example using a general purpose microprocessor, a microcontroller, and/or application-specific logic circuits, and software and/or firmware cooperatively related to them.

Figure 2:
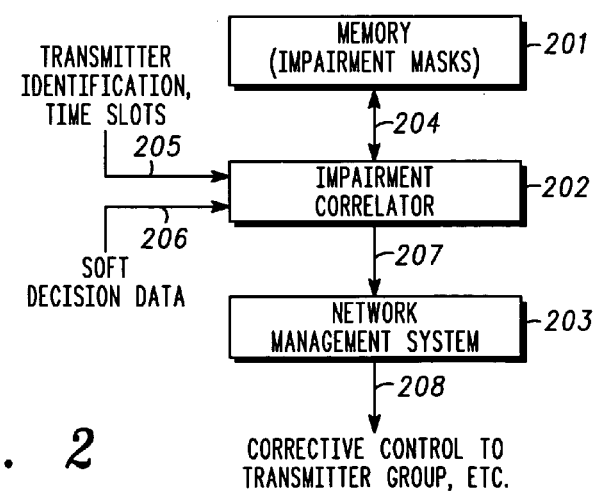
FIG. 2 is block diagram illustrating a system according to an embodiment of the invention.

FIG. 2 is block diagram illustrating a system according to an embodiment of the invention. The system comprises memory 201, impairment correlator 202, and network management system 203. Memory 201 is coupled to impairment correlator 202 and is used to store impairment masks 204 used by impairment correlator 202 for analyzing various types of impairment. Memory 201 may also be used by impairment correlator 202 to store correlation weights for various types of impairment.

Impairment correlator 202 receives soft decision data 206 extracted from a digitally modulated signal. Impairment correlator 202 also receives transmitter identification information 205 to identify a transmitter transmitting the digitally modulated signal for which the soft decision data 206 are being analyzed. This transmitter identification information 205 may include, but is not limited to, such information as the time slot allocated to the transmitter in a TDM or TDMA environment or the code allocated to the transmitter in a CDMA environment. Information such as an internet protocol (IP) address or an ethernet address may also be used. The impairment correlator 202 characterizes the types of impairment affecting the digitally modulated signal and provides the characterization 207 of the impairment to network management system 203. Network management system 203 provides corrective control 208 to the transmitter group, transceiver, or medium to cause the transmitter group, transceiver, or medium to compensate for the impairment. The network management system may also provide reports of the impairment.

A system according to the invention may be implemented as a program storage device readable by a machine. The program storage device tangibly embodies a program of instructions executable by the machine to perform method steps for identifying impairment of a digitally modulated signal received by the machine. The method steps include deriving soft decision data from the digitally modulated signal and performing ratio analysis on the soft decision data derived from the digitally modulated signal.

Figure 3:
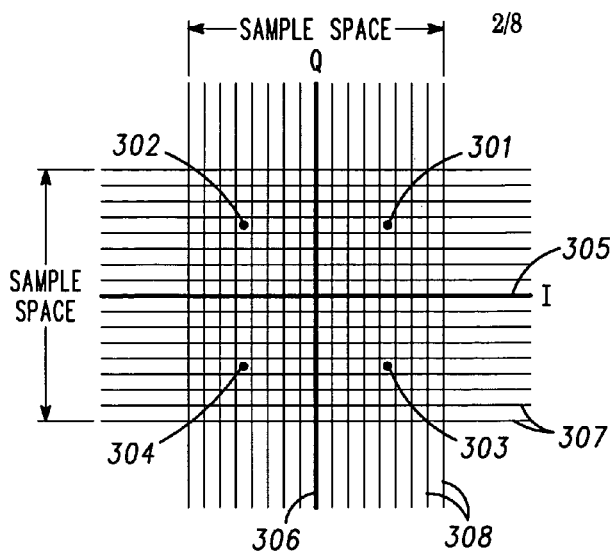
FIG. 3 is a diagram illustrating an example soft decision resolution for an example of a constellation of a QPSK signal in the I/Q plane.

FIG. 3 is a diagram illustrating an example soft decision resolution for an example of a constellation of a QPSK signal in the I/Q plane. In this example, the I axis 305 and the Q axis 306 define four quadrants. One skilled in the art would appreciate that the signal space may be defined as it applies to a given digital modulation scheme. Symbols 301, 302, 303, and 304 are located at ideal locations within each of the four quadrants. The ideal locations are equidistant from the I axis 305, the Q axis 306, and symbol boundaries in signal space define ranges along the I axis 305 and the Q axis 306. While a data slicer is used to decide the quadrant in which each of symbols 301, 302, 303, and 304 is located, an embodiment of the invention utilizes soft decision data to determine with higher resolution the time-accrued sample-by-sample location of symbols 301, 302, 303, and 304. This higher resolution is indicated by divisions 308 along the I axis 305 and divisions 307 along the Q axis 306.

Soft decision data may have any suitable form, for example, digital data represented in two's complement form with one 8-bit I value and one 8-bit Q value representing the location on the I/Q plane of a symbol represented by the soft decision data. Variations, such as the number of bits and the form in which they are expressed, may be employed for specific embodiments of the invention. Alternatively, any other suitable representation of soft decision data may be used. For ease of understanding, an example is described using divisions 307 and 308. In this example, symbol 301 has an I value of 4½ divisions and a Q value of 4½ divisions. Symbol 302 has an I value of −4½ divisions and a Q value of 4½ divisions. Symbol 303 has an I value of 4½ divisions and a Q value of −4½ divisions. Symbol 304 has an I value of −4½ divisions and a Q value of −4½ divisions.

Soft decision data may be used to represent the location of any occurrence of a symbol within a sample space defined by applying divisions 307 and 308 across the constellation in the I/Q plane. A sample space may be defined over the entire constellation or with respect to a portion of the constellation, for example, a quadrant.

Figure 4:
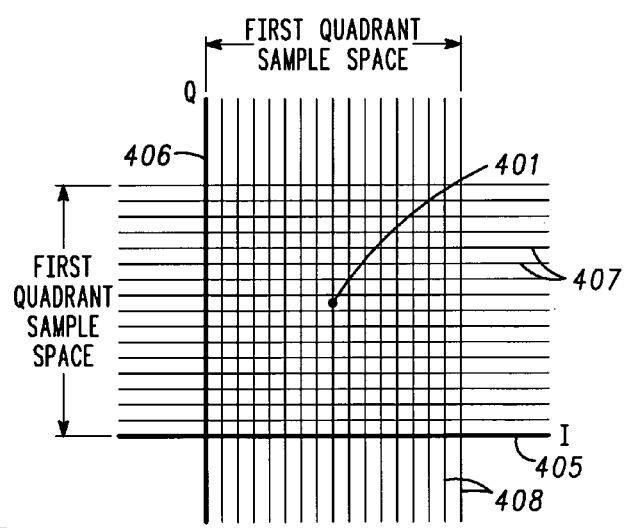
FIG. 4 is a diagram illustrating soft decision resolution for an example of a symbol in the I/Q plane of a QPSK signal.

FIG. 4 is a diagram illustrating soft decision resolution for an example of a symbol in the I/Q plane of a QPSK signal. Symbol 401 is located at an ideal location within the first quadrant relative to I axis 405 and Q axis 406. The higher resolution provided by the use of soft decision data is illustrated by divisions 408 along I axis 405 and divisions 407 along Q axis 406.

Figure 5:
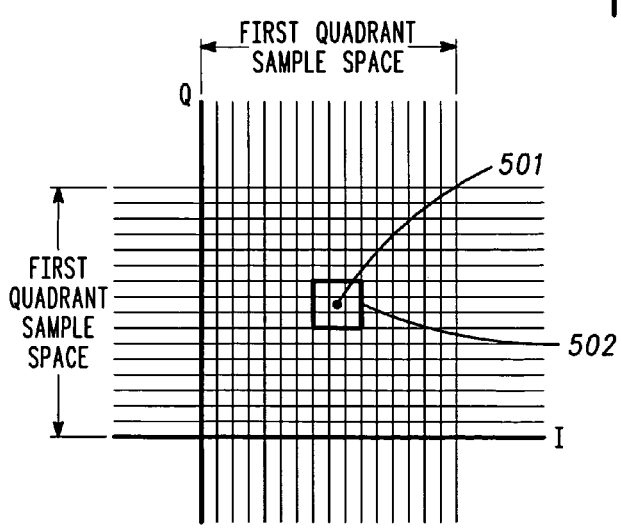
FIG. 5 is a diagram illustrating an example of one tier of performance metric for an error vector magnitude (EVM) mask for a symbol in the I/Q plane of a QPSK signal.

FIG. 5 is a diagram illustrating an example of one tier of performance metric for an error vector magnitude (EVM) mask for a symbol in the I/Q plane of a QPSK signal. An EVM mask may be used to assess the signal-to-noise ratio (SNR) of a received signal. The maximum EVM per symbol for a given signal-to-noise ratio can be defined as $$EVM = \sqrt{(I^2 + Q^2)},$$

where the error magnitudes of the individual I and Q coordinates are relative to the ideal location of the symbol 501. From the calculated EVM, a decision can be made as to whether or not the EVM threshold had been breached, which would imply that the SNR is lower than desired. A multi-tiered set of EVM masks may be used to improve the granularity of the EVM and, therefore, the SNR estimate.

Since the soft decision data provides a finite level of resolution, as indicated by the horizontal and vertical divisions surrounding symbol 501, an EVM mask 502 is defined with reference to the divisions. The EVM mask 502 in this example is defined as extending one division in any direction from the region of soft decision data resolution that includes ideal location of symbol 501. A received signal that yields symbols within the EVM mask 502 implies that the desired SNR has been met, while occurrences of symbols outside the EVM mask 502 implies that the SNR is lower than desired.

In this example, symbol 501 has an ideal symbol location 8½ divisions of soft decision data resolution from the origin in the direction of the I axis and 8½ divisions of soft decision data resolution from the origin in the direction of the Q axis. The EVM mask 502 is defined to cover the area extending from 7 to 10 divisions in the direction of the I axis and from 7 to 10 divisions in the direction of the Q axis. Thus, the EVM mask 502 is centered about the ideal symbol location of symbol 501.

While the EVM mask 502 defines an area in the vicinity of symbol 501, an impairment mask may also be defined to cover an area near a different symbol. Since different types of impairment of a digitally modulated signal yield different effects on the position of symbols over time that correspond to the received signal, an impairment mask can be defined in a shape and size that corresponds to a particular type of impairment. The impairment masks can be used to describe how the symbol as represented in the soft decision data is mapped relative to the other thresholds that can be used to determine the correlated weight of the soft decision data to the impairment mask. This correlated weight can then be used to indicate the likelihood of a particular digital modulation impairment. The following steps are used to perform impairment correlation:

1. Normalize the soft decision data for the symbol to the ideal symbol location.
2. Apply the impairment mask to the soft decision data.
3. Count the number of soft decisions that land in the impairment mask
4. Determine the impairment correlation weight as the number of occurrences within the impairment mask divided by the total number of occurrences.

These steps may be performed iteratively on the same data set with different impairment masks to assess the influence of different types of impairment, and the results may be combined to yield a more comprehensive understanding of the types of impairment that may be involved.

Figure 6:
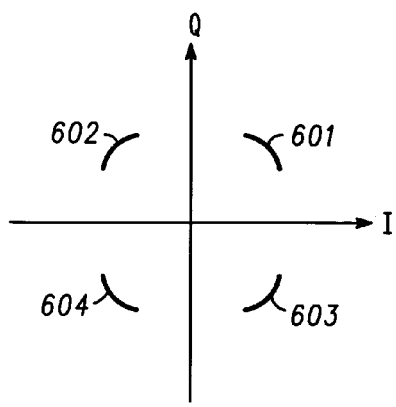
FIG. 6 is a diagram illustrating an effect over time of phase noise on the location of symbols in a constellation of a QPSK signal.

FIG. 6 is a diagram illustrating an effect over time of phase noise on the location of symbols in a constellation of a QPSK signal. As can be seen from the diagram, the phase noise tends to cause an angular displacement of symbols 601, 602, 603, and 604 with respect to the origin of the I/Q plane. Over time, as the phase noise causes various phase shifts to the symbols 601, 602, 603, and 604, the symbols 601, 602, 603, and 604 are displaced in arcuate patterns, resulting in ambiguity as to the intended location of symbols 601, 602, 603, and 604.

Figure 7:
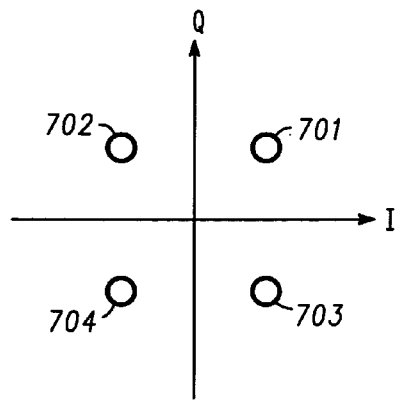
FIG. 7 is a diagram illustrating an effect over time of CW noise on the location of symbols in a constellation of a QPSK signal.

FIG. 7 is a diagram illustrating an effect over time of CW noise on the location of symbols in a constellation of a QPSK signal. As can be seen from the diagram, the CW noise tends to cause displacement of symbols 701, 702, 703, and 704 such that, over time, they appear as circles centered about the ideal locations of symbols 701, 702, 703, and 704.

Figure 8:
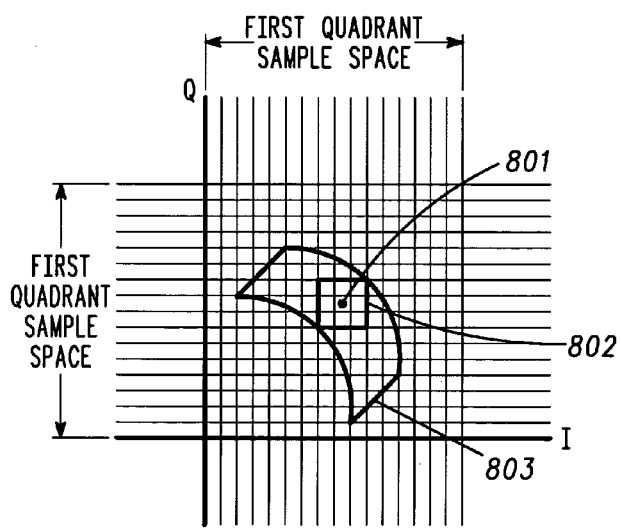
FIG. 8 is a diagram illustrating an example of an impairment mask for evaluating a symbol-level impairment due to phase noise in the I/Q plane of a QPSK signal.

FIG. 8 is a diagram illustrating an example of an impairment mask for evaluating a symbol-level impairment due to phase noise in the I/Q plane of a QPSK signal. Phase noise tends to cause angular displacement of a symbol with respect to the origin of the I/Q plane. Thus, impairment mask 803 is defined to cover an approximately arcuate region located around the ideal location of symbol 801. The arcuate region has a radius located approximately at the origin of the I/Q plane. An EVM mask 802 may also be defined with respect to the ideal location of symbol 801. The EVM mask 802 may be used to assess the SNR of a received signal to determine if the SNR has deteriorated to a level that would justify using the impairment mask 803 to assess the impairment of the digitally modulated signal.

Figure 9:
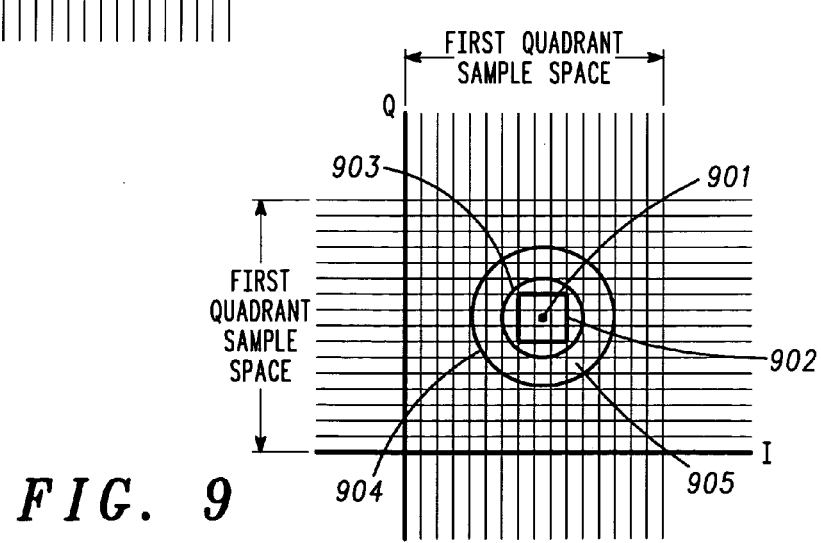
FIG. 9 is a diagram illustrating an example of an impairment mask for evaluating a system-level impairment due to CW noise in the I/Q plane of a QPSK signal.

FIG. 9 is a diagram illustrating an example of an impairment mask for evaluating a system-level impairment due to CW noise in the I/Q plane of a QPSK signal. CW noise tends to cause displacement of the location of a symbol in a circular pattern centered about the ideal location of symbol 901. Thus, an impairment mask 905 may be defined between an inner circle 903 and an outer circle 904. The region covered by the impairment mask 905 coincides with the locations to which CW noise is likely to displace a symbol 901 from its ideal location.

In this example, the outer circle 904 has a diameter in the direction of the I axis extending from approximately four divisions to approximately 13 divisions relative to the origin and diameter in the direction of the Q axis extending from approximately four divisions to approximately 13 divisions relative to the origin. The inner circle 903 has a diameter in the direction of the I axis extending from approximately six divisions to approximately 11 divisions relative to the origin and a diameter in the direction of the Q axis extending from approximately six divisions to approximately 11 divisions relative to the origin. Correlation of impairment as CW noise can be peformed by determining occurrences of symbol 901 within the impairment mask 905 to occurrences of symbol 901 not occurring within the impairment mask 905. For example, if an occurrence of symbol 901 were to occur at a location nine divisions along the I axis and five divisions along the Q axis from the origin, that occurrence would fall within the impairment mask 905. However, if an occurrence of symbol 901 were to occur at a location nine divisions along the I axis and seven divisions along the Q axis from the origin, that occurrence would not fall within the impairment mask 905. By dividing the number of occurrences of a symbol that occur within an impairment mask to the number of occurrences of the symbol that do not occur within the impairment mask, a correlation weight can be calculated for the impairment corresponding to the impairment mask.

An EVM mask 902 may also be defined for assessing the SNR of the received signal. Information obtained using the impairment mask 905 and/or the EVM mask 902 may be used adjust the receiver, the transmitter providing the signal to the receiver, and/or the medium between the transmitter and receiver to reduce the influence of the CW on the SNR of the modulated signal. For example, the characteristics of the receiver, such as the AGC stages and filtering may be adjusted to mitigate the effects of the CW. As another example, the transmit level of the transmitter may be increased to overcome a fixed level of CW interference. Alternatively, the transmitter and receiver may change the channel or frequency range over which they operate to avoid CW interference occurring at specific frequency. As another alternative, the transmitter and receiver may change to a different type of modulation. For example, the transmitter and receiver may change from 16 QAM to QPSK modulation to increase their immunity to the CW interference. While these techniques may be used to reduce the influence that CW interference has on the SNR of a modulated signal, they may also be used to reduce the effects of other types of impairment as well. Also, a gradient of several CW masks may be used to identify multiple CW tones and their respective spectral power densities.

Figure 10:
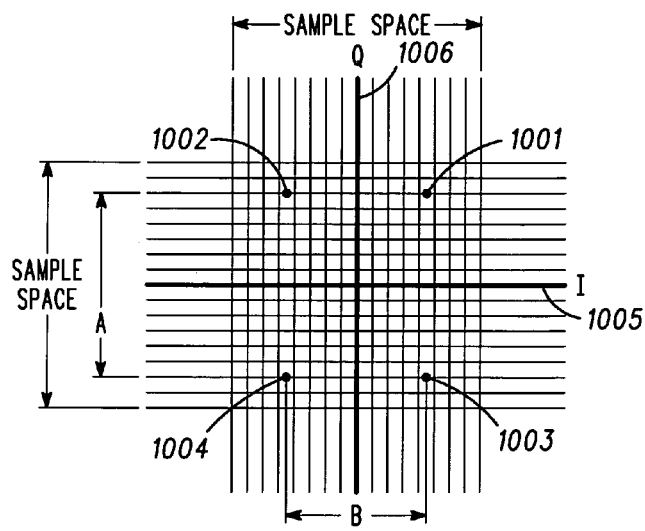
FIG. 10 is a diagram illustrating an example of dislocation of symbols resulting from I/Q imbalance in the I/Q plane of a QPSK signal.

FIG. 10 is a diagram illustrating an example of dislocation of symbols resulting from I/Q imbalance in the I/Q plane of a QPSK signal. Four symbols 1001, 1002, 1003, and 1004 are located on the I/Q plane, one in each quadrant. However, an I/Q imbalance displaces symbols 1001, 1002, 1003, and 1004 from their ideal locations. Symbols 1001, 1002, 1003, and 1004 are farther from I axis 1005 than from Q axis 1006. Symbols 1001 and 1002 are displaced in a positive direction along the Q axis 1006, while symbols 1003 and 1004 are displaced in a negative direction along the Q axis 1006. The impairment illustrated by this I/Q imbalance is an example of a type of impairment that affects different symbols in a constellation in a different manner. Thus, it is referred as a type of constellation-level impairment. Since detection of such impairment may not be possible from looking at only a single symbol, the entire constellation may be examined to detect the impairment. This can be done by calculating the ratio metrics of each symbol in relationship to the other symbols as well as the origin of the signal space. Ratio metrics can be represented as the vector relationship of the symbol to some reference point.

While constellation-level impairment is one type of impairment, another type of impairment has a similar effect on all symbols in a constellation. Such impairment is referred to as symbol-level impairment. For example, phase noise may displace all symbols in constellation by a similar angular offset.

For constellation-level impairment, a measurement of modulation impairment can be made by comparing the relationship of the locations of symbols relative to one another and relative to their ideal locations. The location of the symbols may be evaluated ratiometrically with respect to any point in the constellation plane. Examples of this are that locations of symbols can be compared on a symbol-to-symbol basis or a symbol-to-origin basis, where the origin is the origin of the I/Q plane.

For example, to detect the I/Q imbalance of the QPSK signal illustrated in FIG. 10, the distance (A) between the location of symbols 1001 and 1002 along the Q axis and the location of symbols 1003 and 1004 along the Q axis can be divided by the distance (B) between the location of symbols 1002 and 1004 along the I axis and the location of symbols 1001 and 1003 along the I axis to yield (A/B). If the ratio differs significantly from a value of one, an I/Q amplitude imbalance is indicated. It is preferably to use values representing time-averaged locations of the symbols 1001, 1002, 1003, and 1004 to avoid false identification of imbalance based on slight instantaneous displacement of the locations of the symbols.

In this example, Symbol 1001 is located 4½ divisions in the direction of the I axis and 6 divisions in the direction of the Q axis from the origin. Symbol 1002 is located −4½ divisions in the direction of the I axis and 6 divisions in the direction of the Q axis from the origin. Symbol 1003 is located 4½ divisions in the direction of the I axis and −6 divisions in the direction of the Q axis from the origin. Symbol 1004 is located −4½ divisions in the direction of the I axis and −6 divisions in the direction of the Q axis from the origin. Thus, the distance (A) between the location of symbols 1001 and 1002 along the Q axis and the location of symbols 1003 and 1004 along the Q axis is 6−(−6)=12. The distance (B) between the location of symbols 1002 and 1004 along the I axis and the location of symbols 1001 and 1003 along the I axis is 4½−(−4½)=9. The ratio A/B is thus 12/9=approximately 1.33. Since 1.33 differs significantly (33 percent) from a value of one, an imbalance is indicated.

Several ranges of ratio values may be defined to allow statistical analysis of the locations of symbols relative to a reference point. For example, the percentage of symbols that are correctly positioned may be determined, as well as the percentages of symbols that vary from the ideal positions according to the defined ranges. Such ratio analysis can be performed by an impairment correlator. Ratio analysis can also be used to analyze other types of constellation-level impairment.

Since the location of a symbol in the I/Q plane may be expressed as a vector, ratiometric analysis of the location of symbols can include comparison of the angles and magnitudes of the vectors representing the symbols. Such comparison may be made with respect to the angles and magnitudes of vectors with respect to the origin or any other point in the I/Q plane.

Various ratios can be used to identify various asymmetries and displacements of locations of symbols relative to locations of other symbols in a constellation. These ratios express the relationship of the I and Q coordinates of the different symbols in a constellation. The ratios will yield a known value if each symbol is located at its ideal location. Depending on the particular ratio, the value may change in a known manner under the influence of symbol-level impairment that affects the location of each symbol in a similar manner, or the ratio may be defined in a manner that causes the value to remain unaffected by symbol-level impairment, thereby allowing analysis of constellation-level impairment independent of any symbol-level impairment that may be present.

Impairment masks such as those useful for identifying symbol-level impairment can also be used to identify constellation-level impairment. For example, the I/Q imbalance illustrated in FIG. 10 could be identified using symbol-level impairment masks. As a first step, an EVM mask may be applied to the symbols of the constellation. Since symbols 1001, 1002, 1003, and 1004 are displaced along the Q axis with respect to their ideal positions, they would fall outside of properly defined EVM masks. Consequently, impairment masks could be applied for symbols 1001, 1002, 1003, and 1004. For example, impairment masks could be defined to cover an area including a larger than normal absolute value of the coordinate along the Q axis. The symbols 1001, 1002, 1003, and 1004 displaced by I/Q imbalance would fall within such impairment masks rather than at their ideal locations. Thus, impairment mask such as those useful for identifying symbol-level impairment can also be used to identify constellation-level impairment.

Figure 11:
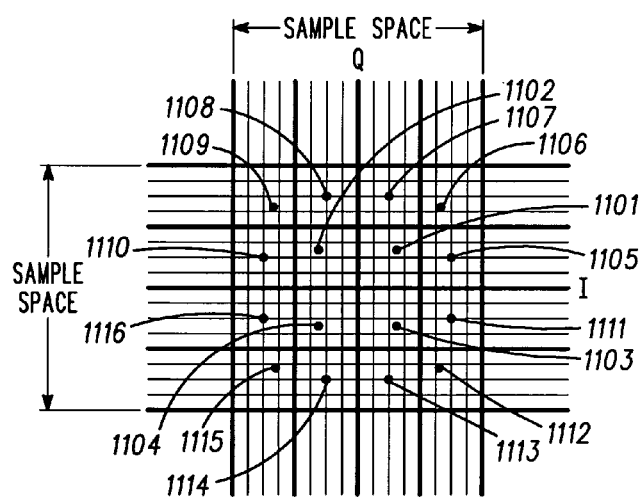
FIG. 11 is a diagram illustrating an example of dislocation of symbols resulting from compression in the I/Q plane of a 16 QAM signal.

FIG. 11 is a diagram illustrating an example of dislocation of symbols resulting from compression in the I/Q plane of a 16 QAM signal. The compression has caused symbols 1101, 1102, 1103, and 1104 to be displaced from their ideal locations in a direction away from the origin of the I/Q plane and symbols 1106, 1109, 1112, and 1115 to be displaced from their ideal locations in a direction toward the origin of the I/Q plane. Symbols 1105, 1107, 1108, 1110, 1111, 1113, 1114, and 1116 are not significantly displaced from their ideal locations.

Since some of the symbols were less affected by the compression, and the perimeter symbols were affected in different ways by the compression, examination of the constellation as a whole is used to identify impairment due to compression, which is another example of a constellation-level impairment.

Impairment masks such as those useful for identifying symbol-level impairments could also be used to identify constellation-level impairment resulting from compression. The pattern of displacement of symbols 1101, 1102, 1103, 1104, 1106, 1109, 1112, and 1115 with symbols 1105, 1107, 1108, 1110, 1111, 1113, 1114, and 1116 remaining substantially at their ideal locations could be used to infer that constellation-level impairment resulting from compression is present.

Figure 12:
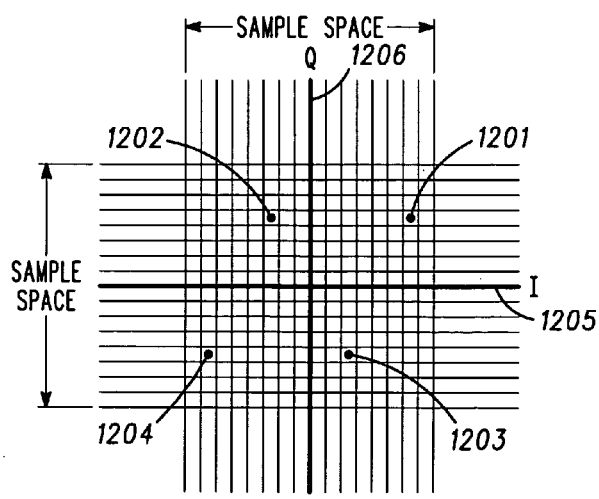
FIG. 12 is a diagram illustrating an example of dislocation of symbols resulting from amplitude modulation (AM) to phase modulation (PM) or non-orthogonal deviation in the I/Q plane of a QPSK signal.

FIG. 12 is a diagram illustrating an example of dislocation of symbols resulting from amplitude modulation (AM) to phase modulation (PM) or non-orthogonal deviation in the I/Q plane of a QPSK signal. This diagram illustrates another example of constellation-level impairment. Symbols 1201 and 1202 are shown displaced in a positive direction along the I axis 1205, while symbols 1203 and 1204 are shown displace in a negative direction along I axis 1205. The location of symbols 1201, 1202, 1203, and 1204 remains substantially unchanged with respect to the direction of Q axis 1206. By examining the constellation as a whole, this type of impairment can be accurately identified.

Figure 13:
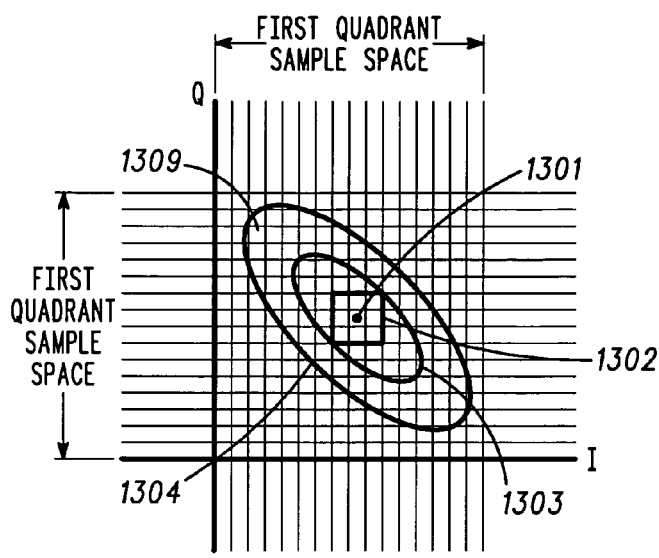
FIG. 13 is a diagram illustrating an example of an impairment mask for evaluating symbol-level impairment due to a combination of CW noise and phase noise in the I/Q plane of a QPSK signal.

FIG. 13 is a diagram illustrating an example of an impairment mask for evaluating symbol-level impairment due to a combination of CW noise and phase noise in the I/Q plane of a QPSK signal. While signal degradation is sometimes limited to one type of impairment, it is common for more than one type of impairment to affect a signal simultaneously. For example, while phase noise tends to displace a symbol in a direction tangential to a circle having its center at the origin of the I/Q plane, CW noise tends to cause a circular displacement pattern centered at the ideal location of the symbol 1301. Thus, a combination of phase noise and CW noise tends to displace symbols into an approximately elliptical shape having a major axis in the same orientation as the displacement caused by the phase noise alone. The elliptical shape may be distorted in a crescent or arcuate manner by the influence of the phase noise.

Thus, an impairment mask 1309, having an inner limit 1303 and an outer limit 1304, may be defined relative to the ideal position of symbol 1301. This impairment mask 1309 may be used to identify combinations of phase noise and CW noise resulting in impairment. The EVM mask 1302 is defined to assess the acceptable SNR relationship of the received signal relative to one or more impairment masks.

Figure 14:
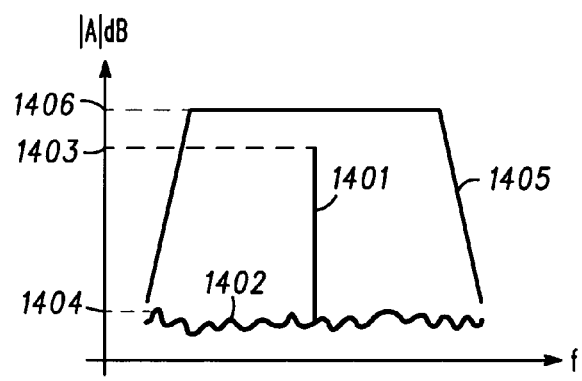
FIG. 14 is a diagram illustrating the relationship between amplitude and frequency for continuous wave (CW) noise and additive white Gaussian noise (AWGN).

FIG. 14 is a diagram illustrating the relationship between amplitude and frequency for continuous wave (CW) noise and additive white Gaussian noise (AWGN). CW noise is of a single frequency, so it is represented by a CW response 1401, or spike, having an amplitude 1403. AWGN has an amplitude 1404 that varies over frequency, as illustrated by AWGN noise floor 1402. As the level of amplitude 1404 approaches the level of amplitude 1403, the effect of the CW noise as viewed in the two-dimensional I/Q plane may be obscured by the effect of the AWGN. However, by providing a three-dimensional I/Q/t analysis according to an embodiment of the invention, the amplitude 1403 of the CW response 1401 may be analyzed with respect to the amplitude 1406 of signal 1405 and amplitude 1404 of AWGN noise floor 1402.

Figure 15:
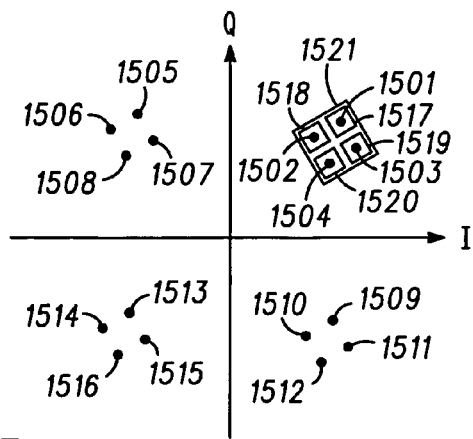
FIG. 15 is a diagram illustrating an example of an effect of reflections on the location of symbols in a constellation in the I/Q plane of a QPSK signal.

FIG. 15 is a diagram illustrating an example of an effect of reflections on the location of symbols in a constellation in the I/Q plane of a QPSK signal. Such reflections include those of the type known in the art as microreflections. Although the technique is described as being applied to impairment due to microreflections, it is understood that it may be applied to impairment due to all kinds of reflections. Microreflections can result in smaller images of the constellation that are rotated and phased relative to the constellation and located at the ideal symbol locations. For example, at the ideal symbol location for the first quadrant, an smaller image of the constellation is found that includes symbol images 1501, 1502, 1503, and 1504. In this example, symbol images 1501, 1502, 1503, and 1504 are illustrated as rotated somewhat counterclockwise. Likewise, symbol images 1505, 1506, 1507, and 1508 form another image of the constellation at another ideal symbol location. Symbol images 1509, 1510, 1511, and 1512 form an image of the constellation at another ideal symbol location. Symbol images 1513, 1514, 1515, and 1516 form yet another image of the constellation at yet another ideal symbol location.

An area 1521 around symbol images 1501, 1502, 1503, and 1504 can be analyzed to identify these symbol images as being indicative of impairment due to microreflections. By defining impairment masks 1517, 1518, 1519, and 1520 at the locations of symbol images 1501, 1502, 1503, and 1504, these symbol images can be identified. Because of the many possible variations of the angle of rotation and spacing of the symbol images, many different sets of impairment masks can be applied. If a set of impairment masks matching the angle of rotation and spacing of the symbol images is applied, the impairment due to microreflections can be identified. An optimization base on an equalizer tap state can be used to fine tune the angle of rotation used for the impairment masks. The spacing of the symbol images, for example, symbol images 1501, 1502, 1503, and 1504, relates to the magnitude of the microreflection, and the angle of rotation relates to the frequency of the modulated carrier and the magnitude of the microreflection time delay. Three-dimensional presentation of the information of FIG. 15 according to an embodiment of the invention is useful to visualize the rotation resulting from an impairment resulting from a microreflection over time.

Ratiometric analysis may also be applied to identify impairment due to microreflections, such as that illustrated in FIG. 15. The positions of the symbol images relative to a reference location, such as the origin of the I/Q plane or an ideal symbol location may be analyzed ratiometrically. For example, the locations of symbol images 1501, 1502, 1503, and 1504 expressed as values of distances in the direction of the I axis and in the direction of the Q axis from the origin can be compared to an ideal symbol location, which, for this example, is approximately equidistant from symbol images 1501, 1502, 1503, and 1504. When comparison of the ratios of the coordinates of the symbol images 1501, 1502, 1503, and 1504 to the ideal symbol location indicates that the symbol images 1501, 1502, 1503, and 1504 are not substantially co-located with the ideal symbol location, the impairment can be recognized.

As another example, ratiometric analysis may be used to determine whether the symbol images are symmetric about the origin or about the I or Q axes. If, for example, the locations of a first set of symbol images, as expressed in I and Q coordinates, do not have corresponding second set of symbol images in a different quadrant having I and Q coordinates that include a negative of a coordinate of the first set of symbol images, lack of symmetry can be determined. For example, if a symbol image in the first quadrant has an I coordinate of 6 and a Q coordinate of 6, the negative value of one or both of the coordinates can be used to determine if there is a corresponding symmetric symbol image in another quadrant.

For example, to determine whether symmetry exists with respect to the I axis, the negative of the Q coordinate can be used to check if there is a corresponding symmetric symbol image having an I coordinate of 6 and a Q coordinate of −6. As another example, to determine whether symmetry exists with respect to the Q axis, the negative of the I coordinate can be used to check if there is a corresponding symmetric symbol image having an I coordinate of −6 and a Q coordinate of 6. To test for symmetry about the origin of the I/Q plane, the negative of both the I coordinate and the Q coordinate can be used to determine if there is a corresponding symmetric symbol image having an I coordinate of −6 and a Q coordinate of −6. It is preferable to use time-averaged coordinate values to avoid spurious indications caused by momentary variations of locations of symbol images. Thus, many variations of ratiometric analysis may be used to identify and correlate many different types of impairment.

Figure 16:
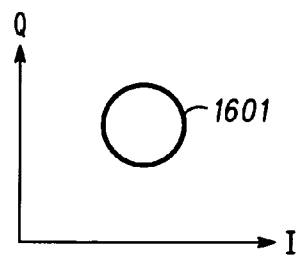
FIG. 16 is a diagram illustrating an example of an effect over time of CW noise on the location of a symbol in the I/Q plane of a QPSK signal.

FIG. 16 is a diagram illustrating an example of an effect over time of CW noise on the location of a symbol in the I/Q plane of a QPSK signal. The CW noise causes the location of the symbol in the any signal space quadrant to be displaced in the form of a diffuse circular pattern over a diffuse circular area 1601 centered at the ideal location of the symbol. As the CW noise power varies over time, the location of the symbol within diffuse circular pattern 1601 varies as well. However, because of the presence of additive white Gaussian noise, the CW noise does not necessarily result over time in a clearly defined ring having a specific inner diameter and a specific outer diameter. Rather, due to the influence of the additive white Gaussian noise, some occurrences of the symbol fall closer to the ideal location of the symbol than they would with pure or extreme CW noise in relation to AWGN, and some occurrences of the symbol fall outside of the region in which they would fall with purely CW noise. Thus, over time, occurrences of the symbol fall within the diffuse circular pattern 1601, preventing detection of the ring pattern characteristic of CW noise and making analysis of the impairment difficult using traditional techniques.

Figure 17:
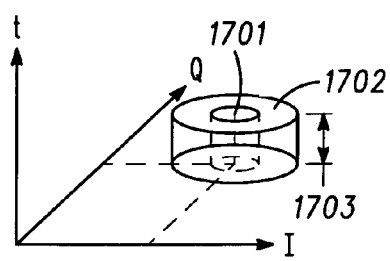
FIG. 17 is a perspective diagram illustrating an example of a three-dimensional representation in I/Q/t space of an impairment mask for evaluating impairment due to CW noise.

FIG. 17 is a perspective diagram illustrating an example of a three-dimensional representation in I/Q/t space of an impairment mask for evaluating impairment due to CW noise. The impairment mask 1702 has a circular shape corresponding to the circular pattern characteristic of CW noise as shown in the I/Q space of FIG. 9. The pattern excludes a circular region surrounding the ideal location of symbol 1701 to prevent occurrences of symbol 1701 located at or near the ideal position from being interpreted as having been affected by CW noise. Note that an EVM mask could also be used for exclusion.

This exclusion technique may be applied to other impairment masks as well. For example, a central region of a different type of impairment mask may be excluded to prevent normal locations of a symbol from being interpreted as having been affected by the type of impairment for which the impairment mask is intended to identify. By referring to exclusion, it should be understood that occurrences of symbols do not need to be completely ignored if they fall within an excluded region. Rather, the locations of all occurrences of all symbols may be provided to the impairment correlator to allow the impairment correlator to determine a correlator yield or weight.

The impairment mask of FIG. 17 has a height 1703 in the direction of the time axis for defining a time statistics window over which the impairment due to CW noise is analyzed. By collecting statistical data on the occurrences of symbols over time using the time statistics window, this technique allows the statistical distribution of occurrences of a symbol over time within the diffuse circular area 1601 to be studied. Thus, relatively unlikely locations of occurrences of the symbol, for example those significantly influenced by additive white Gaussian noise, can be given less significance or disregarded in the analysis.

Figure 18:
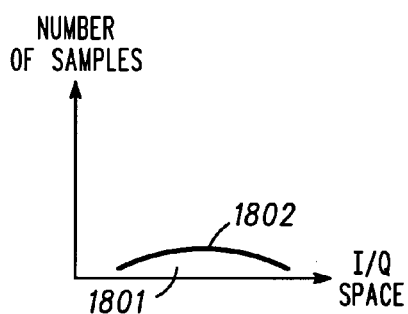
FIG. 18 is a diagram illustrating an example of a distribution of occurrences of a symbol in I/Q space influenced by additive white Gaussian noise.

FIG. 18 is a diagram illustrating an example of a distribution of occurrences of a symbol in I/Q space influenced by additive white Gaussian noise. Locations in I/Q space are represented along the horizontal axis, while the number of occurrences for each location is represented along the vertical axis. The symbol has a ideal location 1801 in I/Q space. However, occurrences of the symbol over time vary from the ideal location 1801 in a distribution 1802 under the influence of additive white Gaussian noise. As can be seen, the most likely location for an occurrence of the symbol remains at the ideal location 1801.

Figure 19:
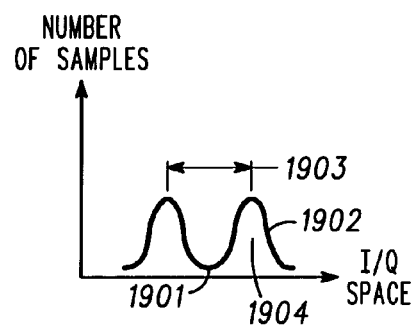
FIG. 19 is a diagram illustrating an example of a distribution of occurrences of a symbol in I/Q space influenced by CW noise.

FIG. 19 is a diagram illustrating an example of a distribution of occurrences of a symbol in I/Q space influenced by CW noise. Locations in I/Q space are represented along the horizontal axis, while the number of occurrences for each location is represented along the vertical axis. The symbol has an ideal location 1901 in I/Q space. However, occurrences of the symbol over time vary from ideal location 1901 in a distribution 1902 under the influence of CW noise. The distance 1903 of the peaks of the CW impairment distribution is proportional to the relative carrier-to-interferer (C/I) ratio of the desired signal to the CW impairment.

Figure 20:
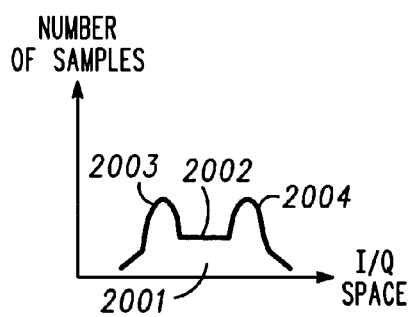
FIG. 20 is a diagram illustrating an example of a distribution of samples of a symbol in I/Q space influenced by a combination of additive white Gaussian noise and CW noise.

FIG. 20 is a diagram illustrating an example of a distribution of samples of a symbol in I/Q space influenced by a combination of additive white Gaussian noise and CW noise. Locations in I/Q space are represented along the horizontal axis, while numbers of occurrences of the symbol at particular locations are represented along the vertical axis. The distribution includes peaks 2003 and 2004 resulting from the influence of the CW noise, as well as an elevated region 2002 resulting from the influence of the additive white Gaussian noise. However, while the distribution as a whole is centered about the ideal location 2001 of the symbol, the ideal location 2001 is not the most likely location for an occurrence of the symbol. Because of the elevated region 2002 and the somewhat elevated peripheral regions of the distribution, occurrences of a symbol could occur over a broad region of I/Q space. This broad region of I/Q space is not significantly different from region defined by the distribution in FIG. 18. Thus, without the aid of the invention, it would be difficult to identify the influence of CW noise impairment on the location of occurrences of a symbol. However, by allowing determination of the distribution illustrated in FIG. 20, the invention allows identification of impairment due to the influence of both CW noise and additive white Gaussian noise as they relate to each other and to the ideal modulated signal.

Figure 21:
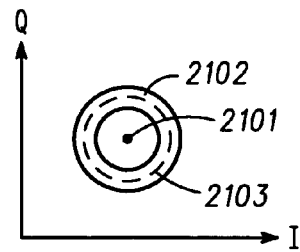
FIG. 21 is a diagram illustrating an example of an impairment mask for evaluating impairment due to CW noise or a combination of CW noise and additive white Gaussian noise in the I/Q plane of a QPSK signal.

FIG. 21 is a diagram illustrating an example of an impairment mask for evaluating impairment due to CW noise or a combination of CW noise and additive white Gaussian noise in the I/Q plane of a QPSK signal. A two-dimensional view of the impairment mask in the I/Q plane shows the ring shape of the impairment mask 2102 centered about the ideal location of symbol 2101. Dotted line 2103 represents the peaks of the distribution of occurrences of the symbol affected by impairment due to CW noise. As can be seen, the peaks represented by dotted line 2103 fall within the ring shape defined by impairment mask 2102, thereby allowing identification of CW noise as a contributor to the impairment. However, in the two-dimensional I/Q plane, the same impairment would appear as an uncorrelated mass of symbols that would fill an area around the ideal symbol position so completely as to prevent a meaningful understanding of the nature of the impairment. However, the three-dimensional representation of FIG. 22 avoids this problem.

Figure 22:
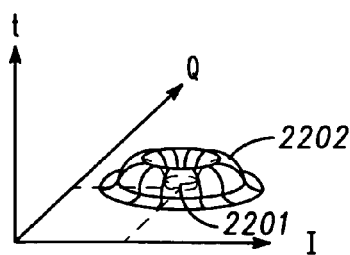
FIG. 22 is a perspective diagram illustrating an example of a three-dimensional representation in I/Q/t space of a distribution of occurrences of a symbol influenced by a combination of CW noise and additive white Gaussian noise of a QPSK signal.

FIG. 22 is a perspective diagram illustrating an example of a three-dimensional representation in I/Q/t space of a distribution of occurrences of a symbol influenced by a combination of CW noise and additive white Gaussian noise of a QPSK signal. The distribution 2202 remains centered about the ideal location of symbol 2201. While the distribution 2202 is complicated by the effects of the combination of CW noise and additive white Gaussian noise, it can be seen that the distribution 2202 still lies substantially within an impairment mask such as that illustrated in FIG. 22. Thus, an impairment mask such as that illustrated in FIG. 22 may be used to identify impairment due to a combination of CW noise and additive white Gaussian noise. Alternatively, an impairment mask could be defined that is precisely tailored to the distribution 2202.

Moreover, since the statistical distribution of the locations of occurrences of the symbol over time are obtained, an embodiment of the invention allows the presentation of impairment information in three dimensions, as illustrated in FIG. 22. As can be seen, the three-dimensional presentation of FIG. 22 provides a much better understanding of the precise nature of the impairment than the diffuse circular region illustrated in FIG. 16. Thus, the invention can provide a much more meaningful presentation of impairment information and, consequently, a much better understanding of any impairment present that could be seen with traditional two-dimensional I/Q analysis by viewing specialized test equipment. While FIGS. 16–22 provide an example of the benefit of applying the invention to impairment due to CW noise in the presence of AWGN, the invention may be applied to all types of impairment, including all types of impairment in the presence of AWGN.

As another example, a three-dimensional presentation of the locations of occurrences of symbols over time in the presence of additive white Gaussian noise is also useful. Without incorporating historical data, a two-dimensional presentation of the same locations does not provide an identifiable pattern of impairment due to AWGN symbol spreading. However, a three-dimensional presentation of the I/Q/t locations result in well defined contours in the three-dimensional surface presentation. Such defined contours in the I/Q/t coordinate system clearly identifies impairment masked by additive white Gaussian noise that would not be seen in an I/Q two-dimensional plane representation.

Figure 23:
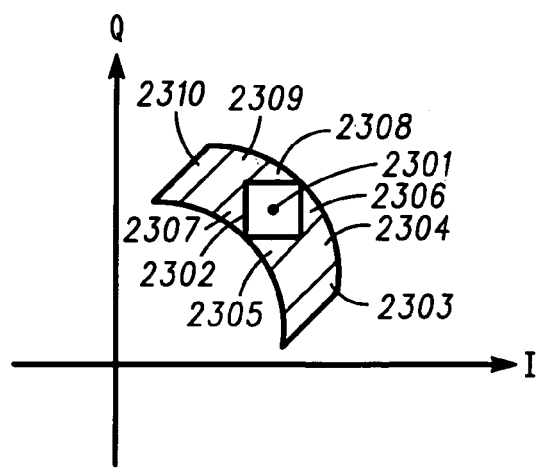
FIG. 23 is a diagram illustrating an example of an impairment mask for identifying and characterizing the statistical distribution of occurrences of symbols influenced by impairment associated with phase noise in the I/Q plane of a QPSK signal.

FIG. 23 is a diagram illustrating an example of an impairment mask for identifying and characterizing the statistical distribution of occurrences of symbols influenced by impairment associated with phase noise in the I/Q plane of a QPSK signal. The impairment mask is centered about an ideal location of a symbol 2301. An EVM mask 2302 is defined about the ideal location of the symbol 2301. The area of the I/Q plane covered by the impairment mask is divided into a plurality of regions 2303, 2304, 2305, 2306, 2307, 2308, 2309, and 2310. Statistical information is obtained as occurrences of symbol 2301 occur in regions 2303, 2304, 2305, 2306, 2307, 2308, 2309, and 2310. This statistical information is used to provide greater detail to reports of impairment associated with this impairment mask. For example, histograms may be provided showing the relative frequency of occurrences of symbol 2301 in regions 2303, 2304, 2305, 2306, 2307, 2308, 2309, and 2310. The statistical information for regions 2305 and 2306 could be combined, as could the statistical information for regions 2307 and 2308. Thus, a system controller or reporting subsystem could report the number of occurrences over a given time in region 2303, in region 2304, in the combination of regions 2305 and 2306, within the EVM mask 2302, in the combination of regions 2307 and 2308, in region 2309, and in region 2310. Such reports allow not only the identification of a particular type of impairment, but also provide substantial quantitative information about the nature and severity of the impairment as they relate to its power spectral density (PSD). The PSD of phase noise impairment can quantify the frequency content of the phase noise in relation to amplitude. A three-dimensional I/Q/t presentation is also useful, especially in the presence of AWGN.

The invention may be used to provide a remote testing capability, although its use is not limited to remote testing. For example, a subscriber terminal or cable modem may be remotely tested from a central location or headend. Application of the invention to such remote testing provides bandwidth efficiency, since the remote device, such as the subscriber terminal or cable modem, can characterize the impairment and concisely transmit the characterization of the impairment back to the central location or headend.

The invention is particularly useful for such an application, as many subscriber communication channels are asymmetric in that they provide greater bandwidth from the central location or headend to the remote device (downstream) than from the remote device to the central location or headend (upstream). Thus, relatively little bandwidth is available for upstream communication. By providing the capability to concisely communicate meaningful information upstream, the invention avoids overloading the upstream channel. The invention may also be used to analyze upstream communication as well.

Figure 24:
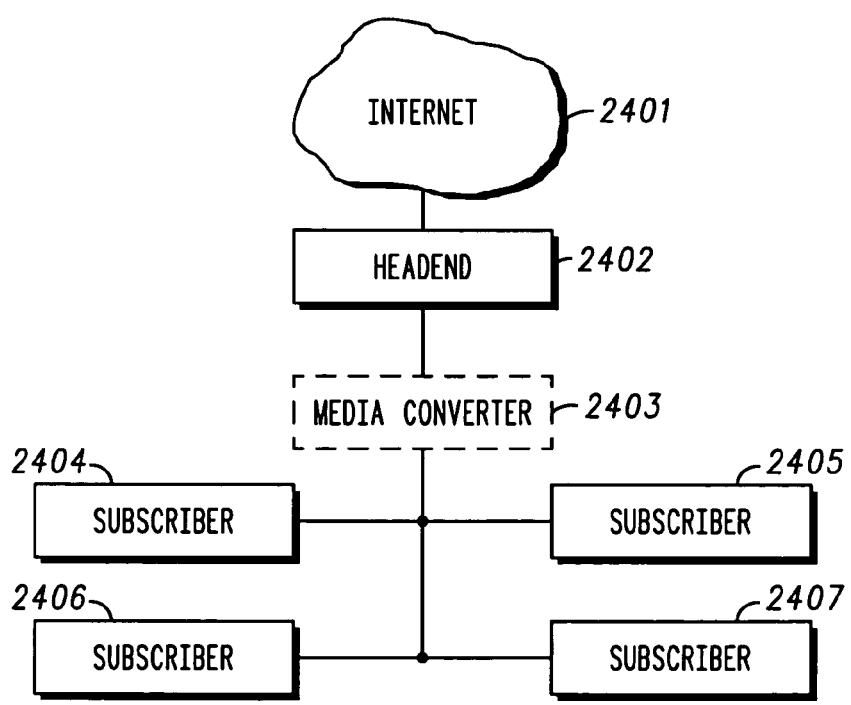
FIG. 24 is a block diagram illustrating an example of a network system. The network system comprises internet 2401, headend 2402, media converter 2403, and subscribers 2404, 2405, 2406, and 2407.

FIG. 24 is a block diagram illustrating an example of a network system. The network system comprises internet 2401, headend 2402, media converter 2403, and subscribers 2404, 2405, 2406, and 2407. While subscribers 2404, 2405, 2405, and 2407 are illustrated, it is understood that the network system may include any number of subscribers. Internet 2401 may be any information network, for example a global information network. Internet 2401 is coupled to headend 2402. Headend 2402 communicates with internet 2401 and subscribers 2404, 2405, 2406, and 2407. Headend 2402 is coupled to media converter 2403. Media converter 2403 is coupled to subscribers 2404, 2405, 2406, and 2407. Communication between headend 2402 and subscribers 2404, 2405, 2406, and 2407 is effected by media converter 2403.

For example, in a hybrid fiber/coax (HFC) cable system, a fiber optic cable supports communication between the headend 2402 and the media converter 2403, and coaxial cable supports communication between media converter 2403 and subscribers 2404, 2405, 2406, and 2407. The media converter 2403 converts the media over which the communication occurs. For example, in a HFC cable system, the media converter 2403 passes signals between the fiber optic cable and the coaxial cable. However, media converter 2403 may be unnecessary if a continuous medium is used between the headend 2402 and subscribers 2404, 2405, 2406, and 2407. Any suitable medium or media may be used between headend 2402 and subscribers 2404, 2405, 2406, and 2407. For example, besides fiber optic cable and coaxial cable, other media such as twisted pair cable, wireless, or satellite communication may be used. Use in conjunction with relatively time invariant media, such as those having fixed positions of a transmitter and a receiver, yield especially meaningful results.

The invention may be applied to any system or component utilizing digitally modulated signals. For example, the invention may be applied to a cable modem or to a cable modem termination system, such as one located at a headend 2402 and used to communicate with cable modems located at subscribers 2404, 2405, 2406, and 2407. The invention may be applied to any digital receiver, such as a receiver for receiving a digitally modulated signal.

Figure 25:
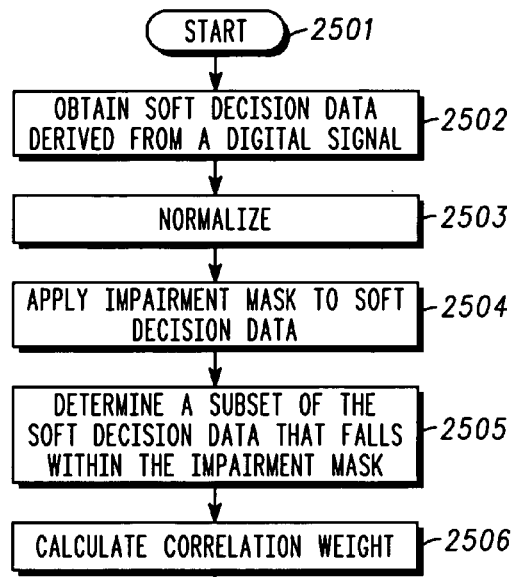
FIG. 25 is a flow diagram illustrating an example of a process according to an embodiment of the invention.

FIG. 25 is a flow diagram illustrating an example of a process according to an embodiment of the invention. The process begins in step 2501. In step 2502, soft decision data are derived from a digital signal. In step 2503, soft decision data are normalized to the ideal locations for symbols. Optionally, step 2503 may be omitted. Thus, any readily apparent displacements of the symbols are adjusted. In step 2504, an impairment mask is applied to the soft decision data. The impairment mask may be may be of any suitable type relating to any type of impairment. For example, the impairment mask may be a phase noise impairment mask, a continuous wave noise impairment mask, a signal reflection impairment mask, an I/Q imbalance impairment mask, a compression impairment mask, an amplitude-modulation-to-phase-modulation impairment mask, a composite phase noise and continuous wave noise impairment mask, any other composite impairment mask for correlating multiple types of impairment, or any other type of impairment mask.

In step 2505, a subset of the soft decision data that occur within the impairment mask is determined. This may be done by determining the number of occurrences of soft decision data that fall within the impairment mask. In step 2506, a correlation weight is calculated. The correlation weight may be calculated by determining the ratio of the number of occurrences of the soft decision data that fall within the impairment mask to the total number of occurrences of the soft decision data. In step 2507, the process ends.

Results from this process may be provided in a number of different ways. For example, a two- or three-dimensional presentation of a distribution of the soft decision data over time may be provided. Information descriptive of a distribution of occurrences of soft decision data within specific regions of an impairment mask may also be provided. Such information may further characterize the nature of a particular type of impairment, for example to determine the severity of the impairment. The likelihood that a type of impairment corresponding to an impairment mask is affecting a digitally modulated signal may also be reported. This likelihood may be determined by comparison of correlation weights. Several correlation weights may also be used to calculate an overall correlation weight.

Figure 26:
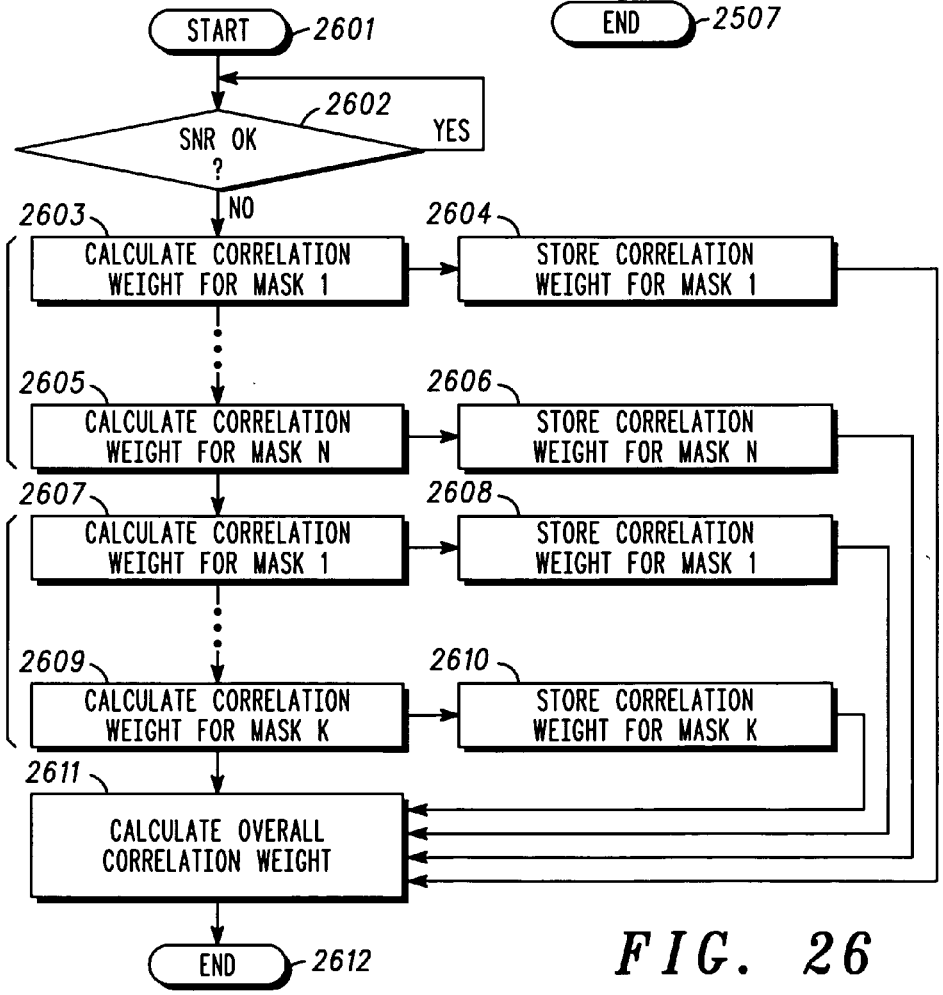
FIG. 26 is a flow diagram illustrating an example of a process according to an embodiment of the invention.

FIG. 26 is a flow diagram illustrating an example of a process according to an embodiment of the invention. The process begins in step 2601. In step 2602, the SNR is analyzed, for example using an EVM mask. However, the analysis of the SNR does not require that an EVM mask be used. If the SNR is found to be acceptable, the process returns to step 2602 and provides an indication that all is well. If the SNR is found to be deficient, the process continues at step 2603. In step 2603, the correlation weight for the first symbol-level impairment mask is determined based on soft decision data collection at a desired level of system granularity. The correlation weight for the first symbol-level impairment mask is stored in step 2604. The correlation weights for other symbol-level impairment masks are calculated and stored, culminating in the determination of the correlation weight for the nth symbol-level impairment mask in step 2605 and its storage in step 2606.

The correlation weight for the first constellation-level impairment mask is determined in step 2607 and stored in step 2608. The correlation weights for other constellation-level impairment masks are calculated and stored, culminating in the determination of the correlation weight for the kth constellation-level impairment mask in step 2609 and its storage in step 2610. The stored correlation weights for all symbol-level and constellation-level impairment masks are used in step 2611 to determine the overall correlation weight for all types of impairment. The data set may be normalized to acknowledge individual weights for each type of impairment as well as to determine the overall correlation weight distributions. The process ends in step 2612.

Processes according to embodiments of the invention may be implemented using a program storage device readable by a machine. The program storage device tangibly embodies a program of instructions executable by the machine to perform the steps of the processes. For example, one such process may be used for identifying impairment of a digitally modulated signal received by the machine.

Accordingly, automatic correlation of impairments, including multiple simultaneous impairments of different types, is provided. The severity of the impairments may be analyzed in comparison to a defined signal-to-noise ratio, which may serve as a threshold for analysis. Data derived from the analysis may be presented in two-dimensional or three-dimensional representations, allowing meaningful display of historical data over time. Other advantages will also be apparent to those of ordinary skill in the art.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for identifying impairments in a digitally modulated signal comprising:
   obtaining soft decision data derived from the digitally modulated signal;
   applying a plurality of predefined impairment masks to the soft decision data, each impairment mask is a set of undesired values associated with the digitally modulated signal and is associated with a different impairment type;
   determining a subset of the soft decision data that occur within each predefined impairment mask;
   calculating a correlation weight based on each subset; and
   based on the correlation weights, determining a likelihood that a particular impairment type is affecting the digitally modulated signal.

2. The method of claim 1 further comprising:
   normalizing the soft decision data.

3. The method of claim 2 wherein the impairment masks are selected from a group consisting of:
   a phase noise impairment mask;
   a continuous wave noise impairment mask;
   a signal reflection impairment mask;
   an I/Q imbalance impairment mask;
   a compression impairment mask;
   an amplitude-modulation-to-phase-modulation impairment mask; and
   a composite phase noise and continuous wave noise impairment mask.

4. The method of claim 2 further comprising
   providing a three-dimensional presentation of a distribution of the soft decision data over time.

5. The method of claim 1 further comprising:
   providing information descriptive of a distribution of occurrences of soft decision data within specific regions of the impairment masks.

6. A method for detecting impairment of a digital signal comprising:
   calculating a first correlation weight for a first predefined symbol-level impairment mask wherein the first predefined symbol-level impairment mask is a first set of undesired values associated with the digital signal;
   storing the first correlation weight;
   calculating a second correlation weight for a first predefined constellation-level impairment mask, the first predefined constellation-level impairment mask operative to detect a different impairment type than the first predefined symbol-level impairment mask and wherein the first predefined constellation-level impairment mask is a second set of undesired values associated with the digital signal;
   storing the second correlation weight; and
   calculating an overall correlation weight based on the first correlation weight and the second correlation weight.

7. The method of claim 6 further comprising:
   calculating a third correlation weight for a second predefined symbol-level impairment mask wherein the second predefined symbol-level impairment mask is a third set of undesired values associated with the digital signal;
   storing the third correlation weight;
   calculating a fourth correlation weight for a second predefined constellation-level impairment mask wherein the second predefined constellation-level impairment mask is a fourth set of undesired values associated with the digital signal; and storing the fourth correlation weight; wherein the calculating the overall correlation weight based on the first correlation weight and the second correlation weight further includes calculating the overall correlation weight based on the first correlation weight, the second correlation weight, the third correlation weight, and the fourth correlation weight.

8. The method of claim 7 further comprising:
measuring a quality of the digital signal.

9. The method of claim 8 wherein the measuring the quality of the digital signal further comprises:
checking a signal-to-noise ratio.

10. The method of claim 6 wherein the first predefined symbol-level impairment mask is selected from a symbol-level impairment mask group consisting of:
a phase noise impairment mask;
a continuous wave noise impairment mask;
a composite phase noise and continuous wave noise impairment mask; and
a signal reflection impairment mask;
and wherein the first predefined constellation-level impairment mask is selected from a constellation-level impairment mask group consisting of:
an I/Q imbalance impairment mask;
a compression impairment mask; and
an amplitude-modulation-to-phase-modulation impairment mask.

11. A digital receiving apparatus comprising:
a receiver responsive to a digitally modulated signal to perform conversion of the digitally modulated signal to soft decision data;
an impairment correlator operatively coupled to the receiver and responsive to the soft decision data to correlate a plurality of different types of impairments of the digitally modulated signal by using a plurality of predefined impairment masks wherein each impairment mask is a set of undesired values associated with the digitally modulated signal; and
a system controller operatively coupled to the impairment correlator to receive a correlation weight from the impairment correlator to determine a likelihood that a particular impairment type is affecting the digitally modulated signal.

12. The digital receiving apparatus of claim 11 further comprising:
a memory device operatively coupled to the impairment correlator to store the plurality of impairment.

13. The digital receiving apparatus of claim 12 further comprising:
an error vector magnitude mask subsystem operatively coupled to the receiver and responsive to the soft decision data to assess a quality of the soft decision data.

14. The digital receiving apparatus of claim 13 wherein the error vector magnitude mask subsystem further comprises:
a SNR analyzer operatively coupled to the receiver and responsive to the soft decision data; and
an error vector magnitude mask memory device operatively coupled to the SNR analyzer to provide an error vector magnitude mask to the SNR analyzer.

15. The digital receiving apparatus of claim 12 wherein the system controller controls the digital receiving apparatus in response to the correlation weight.

16. The digital receiving apparatus of claim 12 wherein the system controller controls a transmitter in response to the correlation weight, the transmitter operatively coupled to the receiver to provide the digitally modulated signal to the receiver.

17. The digital receiving apparatus of claim 12 wherein the system controller controls a medium in response to the correlation weight, the medium operatively coupled to the receiver to convey the digitally modulated signal to the receiver.

18. A cable modem comprising:
a cable modem receiver responsive to a downstream signal to perform conversion of the downstream signal to soft decision data;
an impairment correlator operatively coupled to the cable modem receiver and responsive to the soft decision data to correlate a plurality of different types of impairments of the downstream signal by using a plurality of predefined impairment masks wherein each impairment mask is a set of undesired values associated with the downstream signal; and
a system controller operatively coupled to the impairment correlator to receive a correlation weight from the impairment correlator to determine a likelihood that a particular impairment type is affecting the downstream signal.

19. The cable modem of claim 18 further comprising:
a memory device operatively coupled to the impairment correlator to store the plurality of impairment.

20. The cable modem of claim 19 further comprising:
a cable modem transmitter operatively coupled to the impairment correlator to transmit a correlation weight from the impairment correlator to a cable modem termination system.

21. The cable modem of claim 19 further comprising:
an error vector magnitude mask subsystem operatively coupled to the cable modem receiver and responsive to the soft decision data to assess a quality of the soft decision data.

22. The cable modem of claim 21 wherein the error vector magnitude mask subsystem further comprises:
a SNR analyzer operatively coupled to the cable modem receiver and responsive to the soft decision data; and
an error vector magnitude mask memory device operatively coupled to the SNR analyzer to provide an error vector magnitude mask to the SNR analyzer.

23. A cable modem termination system comprising:
a cable modem termination system receiver responsive to an upstream signal to perform conversion of the upstream signal to soft decision data;
an impairment correlator operatively coupled to the cable modem termination system receiver and responsive to correlate a plurality of different types of impairments of the upstream signal by using a plurality of predefined impairment masks wherein each impairment mask is a set of undesired values associated with the upstream signal; and
a system controller operatively coupled to the impairment correlator to receive a correlation weight from the impairment correlator to determine a likelihood that a particular impairment type is affecting the upstream signal.

24. The cable modem termination system of claim 23 further comprising:
a memory device operatively coupled to the impairment correlator to store the plurality of impairment.

25. The cable modem of claim 24 further comprising:
a network management system operatively coupled to the impairment correlator to provide a corrective control signal to a cable modem transmitting the upstream signal.

26. The cable modem termination system of claim 24 further comprising:
an error vector magnitude mask subsystem operatively coupled to the cable modem termination system receiver and responsive to the soft decision data to assess a quality of the soft decision data.

27. The cable modem of claim 26 wherein the error vector magnitude mask subsystem further comprises:
a SNR analyzer operatively coupled to the cable modem termination system receiver and responsive to the soft decision data; and
an error vector magnitude mask memory device operatively coupled to the SNR analyzer to provide an error vector magnitude mask to the SNR analyzer.

28. A computer program embodied on a computer readable storage medium, executing instructions to perform a method for identifying impairment of a received digitally modulated signal, the method comprising:
applying a plurality of predefined impairment masks to soft decision data received from the digitally modulated signal, each impairment mask is a set of undesired values associated with the digitally modulated signal and is associated with a different impairment type;
determining a subset of the soft decision data that occur within each predefined impairment mask;
calculating a correlation weight based on each subset; and
based on the correlation weights, determining a likelihood that a particular impairment type is affecting the digitally modulated signal.

29. The computer program embodied on a computer readable storage medium of claim 28 wherein the method further comprises:
normalizing the soft decision data.

30. The computer program embodied on a computer readable storage medium of claim 29 wherein the impairment masks are selected from a group consisting of:
a phase noise impairment mask;
a continuous wave noise impairment mask;
a signal reflection impairment mask;
an I/Q imbalance impairment mask;
a compression impairment mask;
an amplitude-modulation-to-phase-modulation impairment mask; and
a composite phase noise and continuous wave noise impairment mask.

31. The computer program embodied on a computer readable storage medium of claim 28 wherein the method further comprises:
providing a three-dimensional presentation of a distribution of the soft decision data over time.

32. The computer program embodied on a computer readable storage medium of claim 28 wherein the method further comprises:
providing information descriptive of a distribution of occurrences of soft decision data within specific regions of the impairment masks.

* * * * *